(12) United States Patent
Easteal et al.

(10) Patent No.: US 9,394,423 B2
(45) Date of Patent: Jul. 19, 2016

(54) FIRE RETARDANT POLYPROPYLENE

(75) Inventors: Allan James Easteal, Auckland (NZ);
Ralph Cooney, legal representative, Mt. Eden (NZ); Kaluachchl Gamage Karnika De Silva, Auckland (NZ); Debes Bhattacharrya, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 0 days.

(21) Appl. No.: 13/980,248

(22) PCT Filed: Jan. 16, 2012

(86) PCT No.: PCT/NZ2012/000002
§ 371 (c)(1),
(2), (4) Date: Dec. 24, 2013

(87) PCT Pub. No.: WO2012/099478
PCT Pub. Date: Jul. 26, 2012

(65) Prior Publication Data
US 2014/0179848 A1    Jun. 26, 2014

(30) Foreign Application Priority Data
Jan. 17, 2011 (NZ) ........................................ 590534

(51) Int. Cl.
| | |
|---|---|
| C08K 3/32 | (2006.01) |
| C08K 3/34 | (2006.01) |
| C08L 23/10 | (2006.01) |
| C08L 23/12 | (2006.01) |
| C09K 21/04 | (2006.01) |
| C08F 110/06 | (2006.01) |

(52) U.S. Cl.
CPC ................. *C08K 3/32* (2013.01); *C08F 110/06* (2013.01); *C08K 3/34* (2013.01); *C08L 23/12* (2013.01); *C09K 21/04* (2013.01)

(58) Field of Classification Search
CPC ............ C08K 3/32; C08K 5/53; C08L 23/12; C08L 23/00; C08L 23/10
See application file for complete search history.

(56) References Cited

U.S. PATENT DOCUMENTS 4,804,698 A * 2/1989 Schleifstein ..................... 524/89
5,326,805 A * 7/1994 Sicken et al. ................. 524/101

(Continued)

FOREIGN PATENT DOCUMENTS

EP         2125948 A1 * 12/2009
JP    2005097574 A  *  4/2005

(Continued)

OTHER PUBLICATIONS

Bakar (Flammability and Mechanical Properties of Wood Flour-Filled Polypropylene Composites. Journal of Applied Polymer Science. vol. 116. 2010. pp. 2714-2722).*

(Continued)

*Primary Examiner* — Brieann R Fink
(74) *Attorney, Agent, or Firm* — Sheridan Ross P.C.

(57) ABSTRACT

A fire retardant material comprising preferably at least 60% polypropylene having a flexural modulus of 2.8 GPa or above and a fire retardancy rating of UL-94 V-1 or better. The fire retardant material is preferably halogen and glass-fiber free. It may contain a fire retardant agent (e.g. a polymeric APP-crystal phase II type fire retardant fire retardant) and a filler. Also methods for producing such a fire retardant material.

25 Claims, 13 Drawing Sheets

(56) References Cited

U.S. PATENT DOCUMENTS 8,444,884 B2* 5/2013 Futterer et al. ............ 252/606
2002/0155348 A1 10/2002 Gitto
2012/0225291 A1* 9/2012 Karayianni ............ 428/375

FOREIGN PATENT DOCUMENTS

WO    WO 2008/079998 A1    7/2008
WO    WO 2009/081381 A1    7/2009

OTHER PUBLICATIONS

Omnexus (Achieve excellent FR performance with reduced smoke emissions in PP compounds. Solution Case Study. 2014. 2 pages).*
CBC (Non-halogen, Phosphate-Type Flame Retardants (TERRAJU). Chemicals & Resins: Industrial Materials. 2014. 3 pages).*
Machine translated English equivalent of JP 2005-097574 (Apr. 2005, 26 pages).*
Su (Preparation of Halogen-free Flame Retarded Polypropylene. Zhongguo Suliao. 25(11). 2011. pp. 66-69).*
Google translation (2014, 1 page).*
Clariant (Exolit Overview. Clariant International Ltd. Nov. 2008. 9 pages).*
Almeras (Effect of fillers on the fire retardancy of intumescent polypropylene compounds. Polymer Degradation and Stability. 2003; 82; pp. 325-331).*
Human translation of Su (Preparation of Halogen-free Flame Retarded Polypropylene. Zhongguo Suliao. 25(11). 2011. pp. 66-69).*
International Search Report prepared by the Australian Patent Office on Apr. 27, 2012, for International Application No. PCT/NZ2012/000002.
Written Opinion prepared by the Australian Patent Office on Apr. 27, 2012, for International Application No. PCT/NZ2012/000002.
Longerey, M et al. "Talcs and brominated trimethylphenyl indane/$Sb_2O_3$ blend in a PP-PE copolymer." Polymer Degradation and Stability (1999), vol. 64, pp. 489-496. See p. 491, paragraph 3; p. 492, paragraph 1; p. 494, Tables 4 & 5, compositions with talc type C, D or E and FR.
Almeras, X et al. "Effect of fillers on the fire retardancy of intumescent polypropylene compounds" Polymer Degradation and Stability (2003), vol. 82, pp. 325-331. See paragraph 2.1; Table 1; paragraph 2.2.
Duquesne, S et al. "Influence of talc on the fire retardant properties of highly filled intumescent polypropylene composites" Polymers for Advanced Technologies (2008), vol. 19, pp. 620-627. See p. 620, paragraph 2; p. 622, Table 3, Formulation PP/Intu/Talc-25/10.

* cited by examiner

FIG. 2
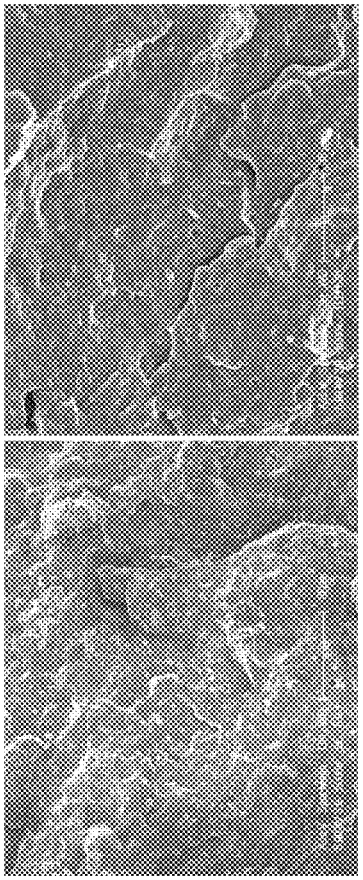
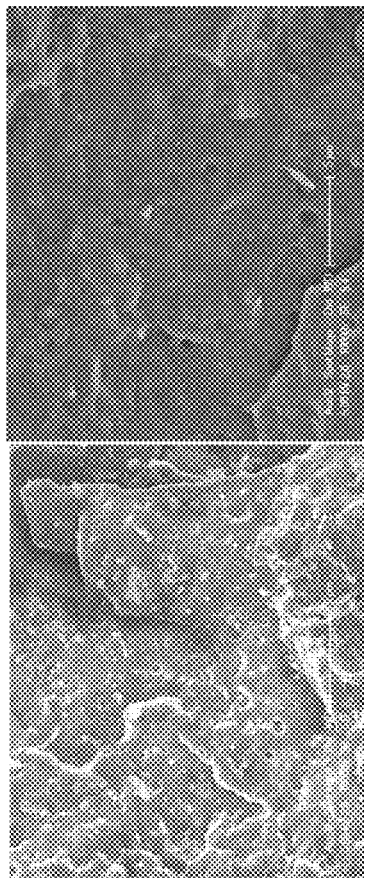
Fig. 2a   Fig. 2b   Fig. 2c   Fig. 2d

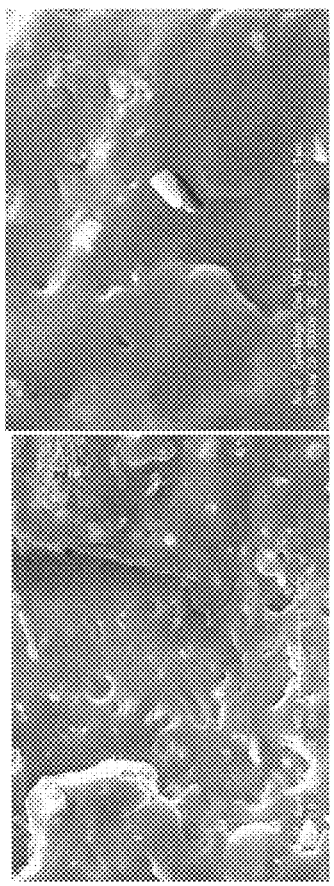
Fig. 2e
Fig. 2f
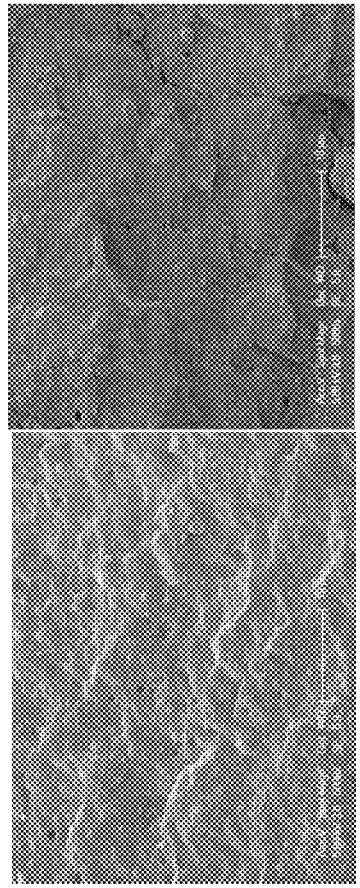
Fig. 2g
Fig. 2h

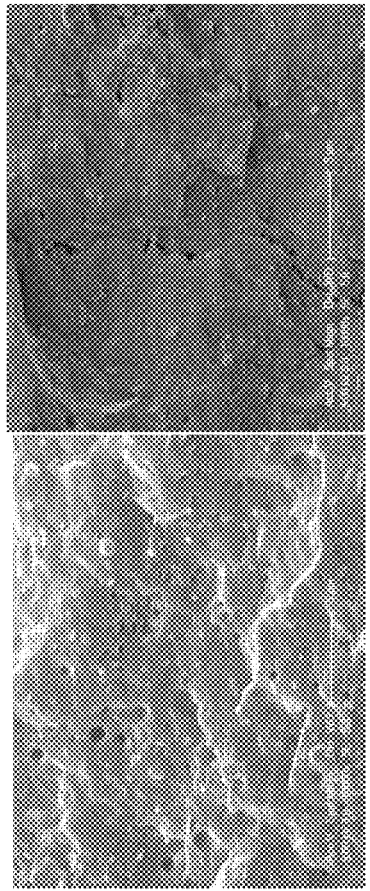
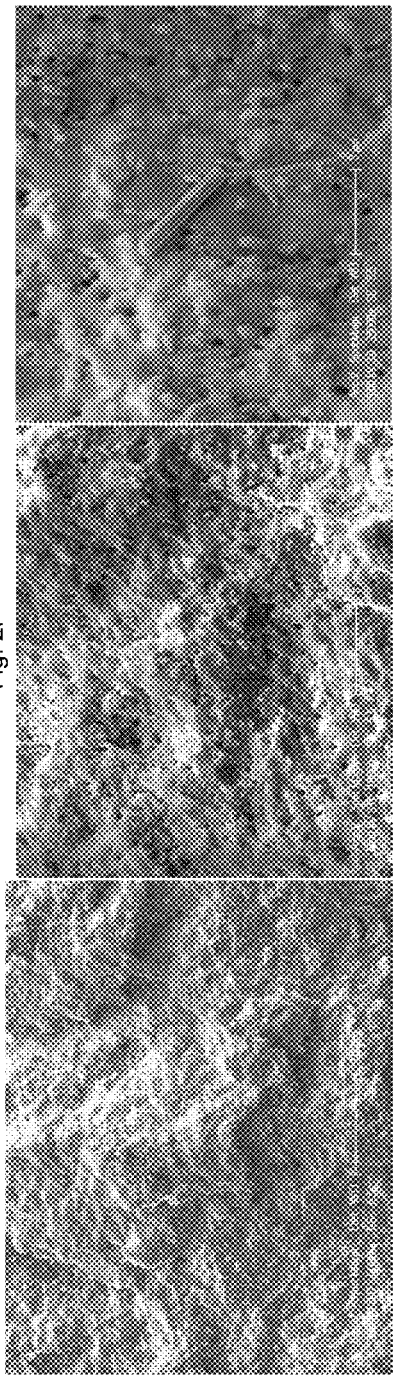

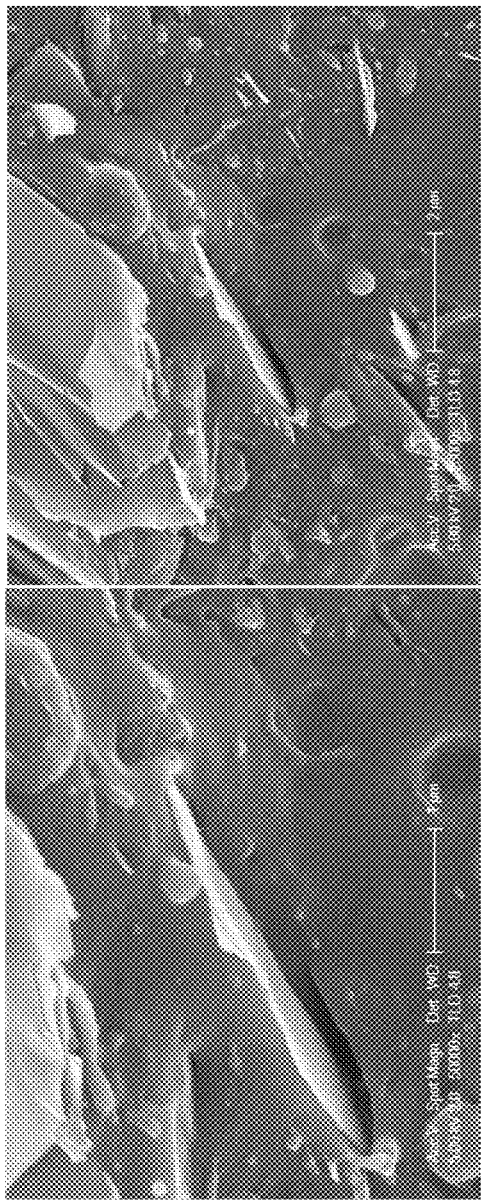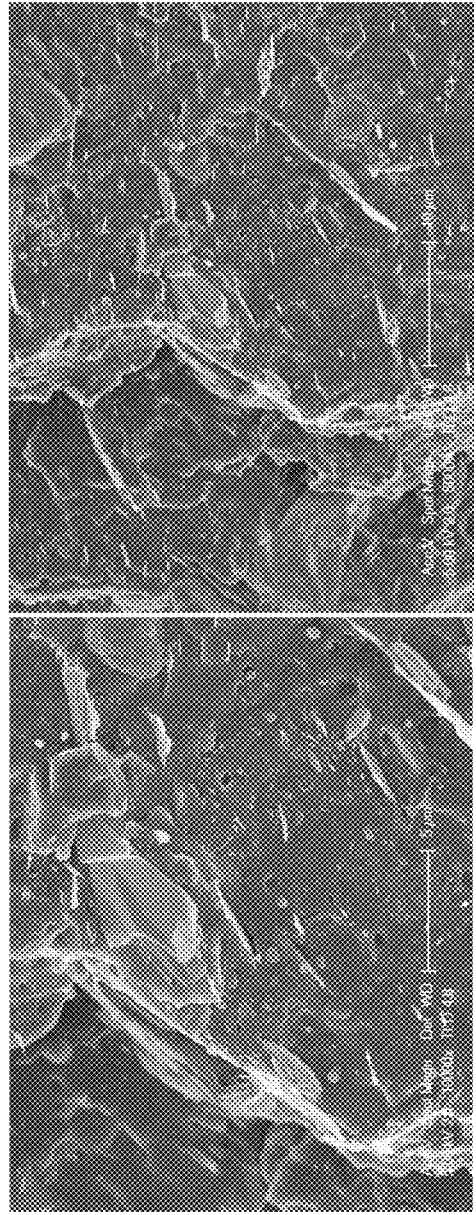

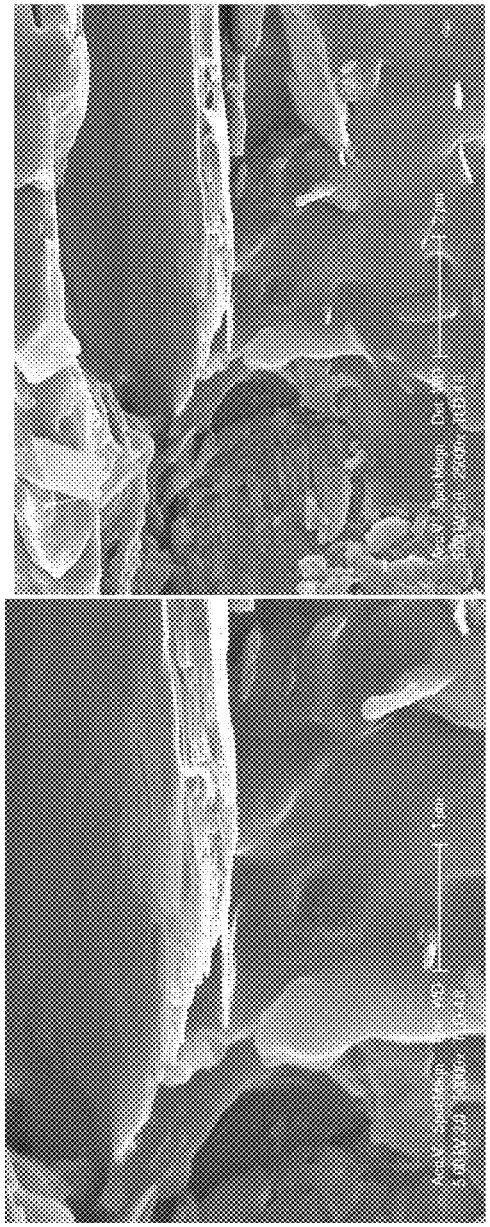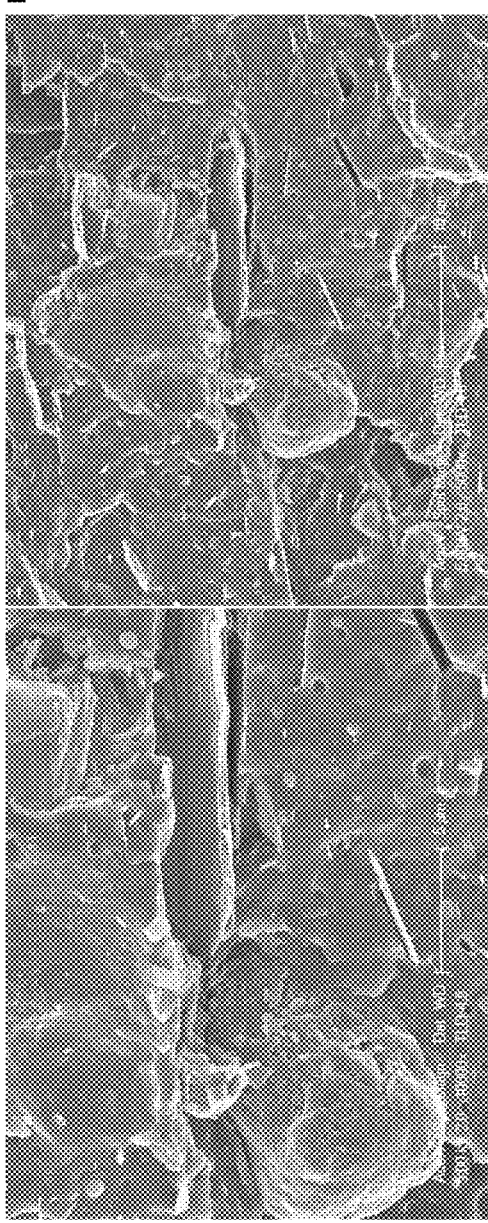

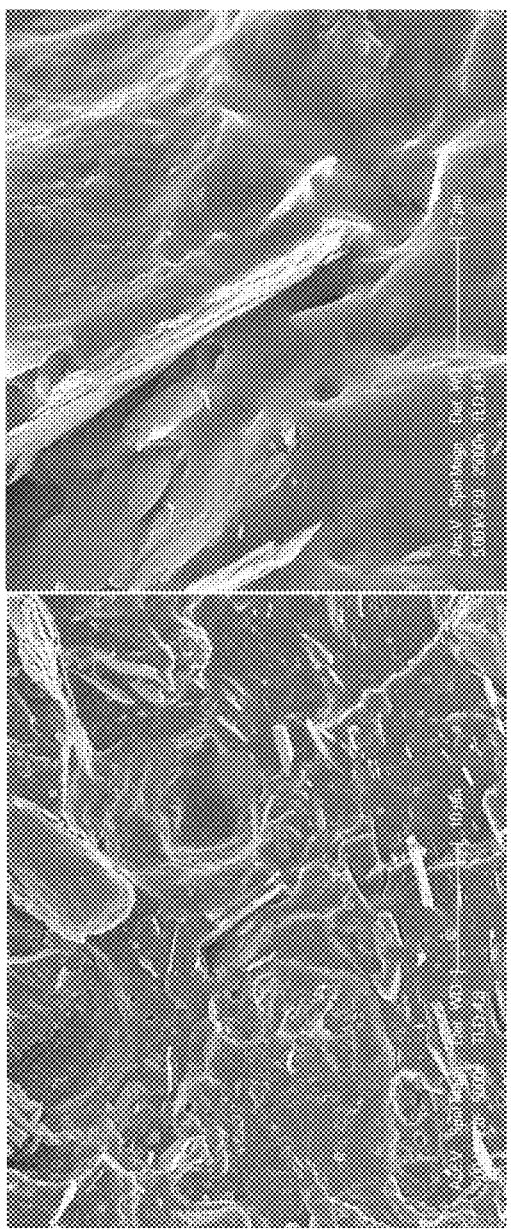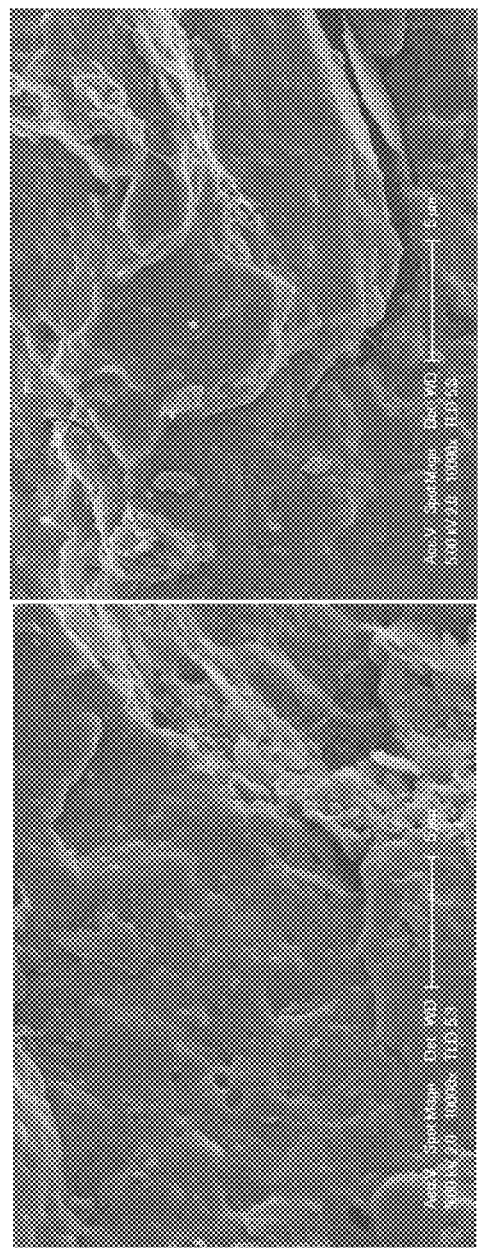

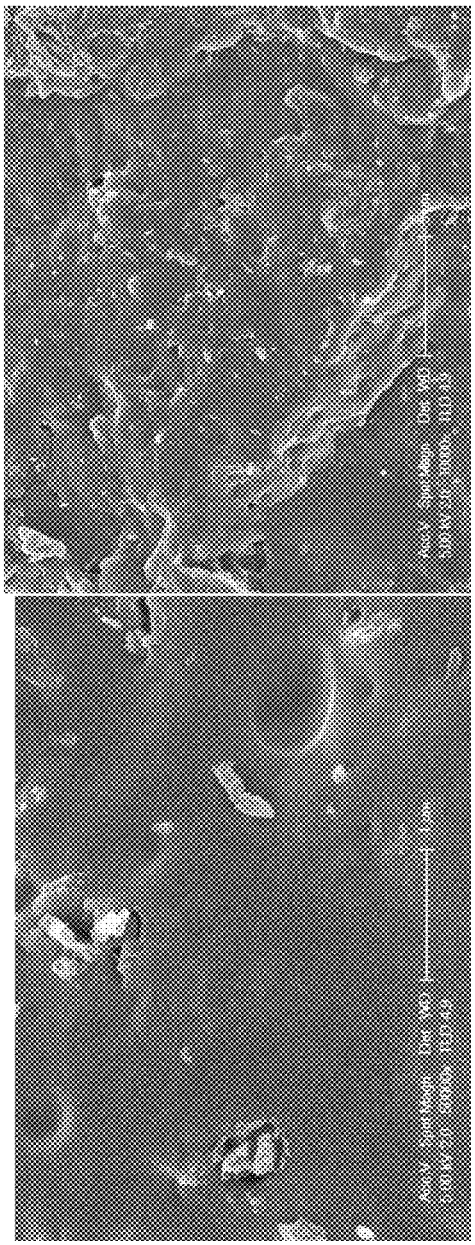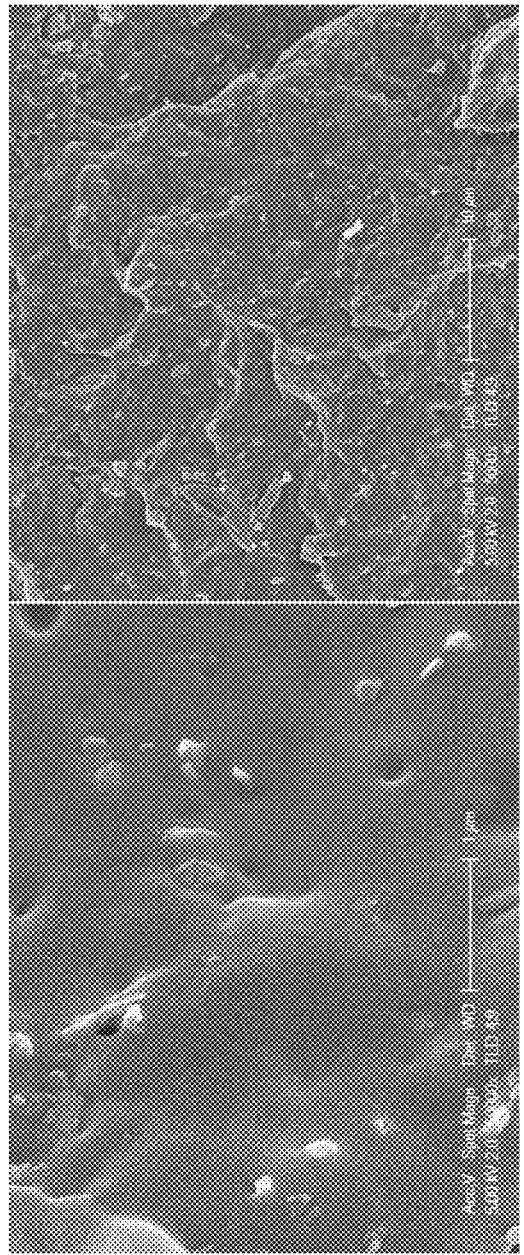
Fig. 2aa  Fig. 2cc
Fig. 2z  Fig. 2bb

FIRE RETARDANT POLYPROPYLENE

CROSS REFERENCE TO RELATED APPLICATIONS

This application is a national stage application under 35 U.S.C. 371 and claims the benefit of PCT Application No. PCT/NZ2012/000002 having an international filing date of 16 Jan. 2012, which designated the United States, and which PCT application claimed the benefit of New Zealand Patent Application No. 590534 filed on 17 Jan. 2011, the entire disclosure of each is incorporated by reference herein.

TECHNICAL FIELD

The invention relates to polymers, and in particular polypropylene polymers which have both high fire resistance and a high degree of mechanical strength.

BACKGROUND ART

Polymeric materials are well known and widely used because of their high versatility. Polypropylene is a particularly desirable polymer because of its low cost compared to engineered plastics and because it is highly amenable to recycling. One particular drawback of polymers is that because they are hydrocarbon-based, they are generally not fire resistant.

It is known to make polymeric materials more fire resistant or fire retardant by the use of additives. However, the use of additives can compromise other qualities of the polymer, such as for example the mechanical strength.

Some additives provide an appropriate balance between fire resistance and mechanical strength, however many of these additives are undesirable from point of view of cost or chemical toxicity. For instance, the most efficient flame retardant additives currently available are brominated materials, such as the decabromodiphenyl ethers (DecaBDEs). DecaBDEs have been used as flame retardants in electronics, wire and cable insulation, textiles, automobiles and aircraft, amongst others. Although DecaBDEs are very good at minimising the spread of flame, they are not recyclable and in addition have highly toxic and carcinogenic degradation products. DecaBDEs have been banned in many places including Europe and the US, where it is expected that they will be phased out completely by the end of 2013.

Other additives used to combat the spread of fire in polymeric materials include metal hydroxides such as alumina trihydrate (ATH) and $Mg(OH)_2$ or materials such as halloysite nanotubes (HNT). These have been used to impart fire retardancy properties to polymeric materials, however they require a very high dose, usually greater than 50% w/w, in order to achieve a high (UL-94 V-0) fire rating. They have a low level of compatibility with the polymer matrix and the resultant material typically has a very poor appearance as well as low gloss and scratch resistance.

It is an object of the present invention to provide a fire retardant material including polypropylene which has both high fire retardancy rating and a good level of flexural and tensile modulus.

According to a first aspect the invention provides a fire retardant material comprising polypropylene having a flexural modulus of 2.8 GPa or above and a fire retardancy rating of UL-94 V-1 or better.

Alternatively, the fire retardant material may have a flexural modulus of 3 GPa or above and a fire retardancy rating of UL-94 V-1 or better.

Alternatively, the fire retardant material may have a flexural modulus of 2.8 GPa or above and a fire retardancy rating of UL-94 V-0.

Preferably the fire retardant material has a flexural modulus of 3 GPa or above and a fire retardancy rating of UL-94 V-0.

The fire retardant material is preferably halogen-free and/or free from glass-fibres.

Preferably, the fire retardant material comprises at least 60% polypropylene, more preferably 60-80% polypropylene and most preferably at least about 70% polypropylene.

In the present invention, any form of polypropylene can be used. Isotactic or syndiotactic polypropylene or any mixture thereof, or of any degree of crystallinity can be used. The polypropylene may be initially in pelletised form, or it may be all or partially in powdered form. The fire retardant material further includes a fire retardant, preferably in an amount of 10-35%, more preferably in an amount of 15-25% and most preferably in an amount of about 20%.

Preferably the fire retardant is an ammonium polyphosphate (APP), more preferably a polymeric APP-crystal phase II type fire retardant.

The preferred fire retardant of the present invention is a polymeric APP-crystal phase II type fire retardant. APP fire retardants are based around ammonium polyphosphates of the following structure.

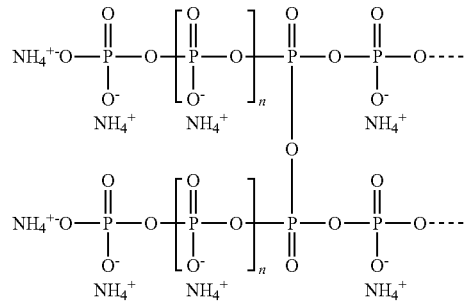

The APP II structure is cross-linked or branched, with "n" being typically higher than 1000. Polymeric APP-crystal phase II type fire retardants have high stability and low water solubility.

Most preferably the fire retardant agent is Budit®3167. Budit®3167 is a commercially available fire retardant. Budit®3167 is of low extractability in water compared to other traditional fire retardants and is thus considered to be an environmentally friendly halogen-free alternative. Budit®3167 contains all active components necessary for intumescence: catalyst, carbonific and spumescent agent. Budit®3167 is also regarded as a highly desirable smoke retardant from the point of view of its low smoke density and low smoke toxicity upon burning. Budit®3167 satisfies the stringent requirements for use in aircraft interiors, with the limits of hydrogen cyanide, carbon monoxide, nitrous gases, sulphur dioxide, hydrogen fluoride and hydrogen chloride all falling well below the limits specified by the ABD (Airbus Directive) 0031 test.

The fire retardant material further includes a filler, preferably talc. The talc is preferably present in an amount of 5-20% wt/wt, more preferably 8-12% wt/wt and most preferably in an amount of about 10% wt/wt to impart higher stiffness to the fire retardant material.

Talc is a hydrated magnesium silicate whose chemical formula is $Mg_3Si_4O_{10}(OH)_2$ with flattened tabular crystals with a hexagonal cross-section. Talc is present as a chemically inert filler, a reinforcing agent, a heat sink and a nucleating agent to provide improvements in the crystallisation temperature (i.e. raising of the freezing point of the polypropylene) as measured by differential scanning calorimetry (DSC). An improved crystallisation temperature with a consequently lower heat flow translates into a high heat deflection temperature, greater control of warpage, shrinking and other dimensional elements and may further provide improvements in injection moulding cycle times to enable parts to be removed more quickly from the mould.

It is known that talc consists of a layer or sheet of brucite $(Mg(OH)_2)$ sandwiched between two sheets of silica $(SiO_2)$. The layers of $Mg(OH)_2$ are bonded by weak van der Waals' forces and hence talc can readily undergo exfoliation and cleavage to form high aspect ratio particles, which can significantly improve the stiffness of polymers. Milling is a useful way to achieve high aspect ratio particles.

The fire retardant may further include an antioxidant, for example, Irganox® 1010. The antioxidant may be present in an amount up to 3% wt/wt, more preferably in an amount up to 1% wt/wt.

According to a second aspect the invention provides a fire retardant material comprising: polypropylene 60-80%;
    fire retardant 10-30%; and
    talc 5-20%

According to a third aspect the invention provides a fire retardant material comprising:
    polypropylene 60-70%;
    fire retardant 20%; and
    talc 5-20%

According to a fourth aspect the invention provides a fire retardant material comprising:
    polypropylene 60-80%;
    a polymeric APP-crystal phase II type fire retardant 10-30%; and
    talc 5-20%

According to a fifth aspect the invention provides a fire retardant material comprising:
    polypropylene 60-70%;
    a polymeric APP-crystal phase II type fire retardant 20%; and
    talc 5-20%

The present applicants have surprisingly found that a polypropylene having a specific combination of fire retardants and prepared in a specific manner displays suitable levels of mechanical strength and fire retardancy.

According to a sixth aspect the invention provides a method of forming a fire retardant material comprising:
    forming a first blend of polypropylene and filler;
    forming a second blend of polypropylene and fire retardant
    combining the first and second blends; and optionally adding polypropylene According to a seventh aspect the invention provides a method of forming a fire retardant material comprising:
    forming a first blend of polypropylene and filler;
    combining the first blend with a fire retardant; and optionally adding polypropylene Preferably, total polypropylene is 60-80%, more preferably at least 60% and most preferably at least 70%.

Preferably total fire retardant is 10-35%, more preferably 15-25% and most preferably 20%

Preferably, the fire retardant is an ammonium polyphosphate, more preferably a polymeric APP-crystal phase II type fire retardant, most preferably the fire retardant agent is Budit®3167.

Preferably the filler is talc, which is preferably present in an amount of 5-20% wt/wt, more preferably 8-12% wt/wt and most preferably about 10% wt/wt.

The method may also further include the step of adding an antioxidant, such as Irganox®1010. The antioxidant may be present in an amount up to 3% wt/wt, or more preferably in an amount up to 1% wt/wt.

The method of combining the chemical species in the present invention is of considerable significance. The method of mixing requires that the talc is added in a "masterbatch" form. That means the talc is pre-mixed with the polypropylene prior to the addition of the fire retardant, or a pre-prepared commercial blend of polypropylene and talc is used. Without wishing to be bound by theory, it is believed mixing in this order minimises interference between the talc and the fire retardant. It is believed fire retardants such as Budit®3167 can become trapped or bonded to the magnesium hydroxide in between the silica plates in talc. By preparing the masterbatch of the polypropylene with the talc, this subsequent deactivation of the fire retardant is avoided.

FIG. 1 shows the X-ray powder diffraction pattern of talc and talc in a number of PP blends with Budit 3167 of the present invention, illustrating exfoliation of talc in the PP Budit 3167 blends.

Scanning electron microscopy (SEM) studies indicate the commercially available heat stabilized crystal phase II APP fire retardant additives disappear from the PP matrix in the presence of traditional fire retardant additives like $Mg(OH)_2$ indicating a possible reaction with APP and diminishing the effectiveness of the fire retardant additive. Similar effects were observed in the presence of nanotubes such as halloysite. However the presence of an inert filler like talc resulted in no interference to the effectiveness of the fire retardant additive. FIG. 2 shows a series of SEM images which illustrate the dispersion of the fire retardant in the polypropylene matrix, the exfoliation of talc and, in some cases, the disappearance of the fire retardant in the presence of unsuitable fillers.

DESCRIPTION OF THE FIGURES

FIG. 2 shows a series of SEM images which illustrate the dispersion of the fire retardant in the polypropylene matrix, the exfoliation of talc and, in some cases, the disappearance of the fire retardant in the presence of unsuitable fillers.

FIGS. 2a-2j show FRB-B reacting with Mg(OH) and disappearing from the surface. Specifically:
    2a FR 79—30% FR-B additive—5000 magnification.
    2b FR 91—12:20:12 HNT:FR-B:$Mg(OH)_2$—5000 magnification.
    2c FR 79—30% FR-B additive—10000 magnification.
    2d FR 91—12:20: 12 HNT:FR-B:$Mg(OH)_2$—10000 magnification.
    2e FRPP 91—HNT:FR-B:$Mg(OH)_2$12:20:12 50,000 magnification.
    2f FRPP 79—FR-B 30 25000 magnification.
    2g FRPP X(s)—HNT:$Mg(OH)_2$20:20 5000 magnification.
    2h FRPP 71 (s)—HNT:FR-B:$Mg(OH)_2$4:12:4 5000 magnification.
    2i FRPP X(s)—HNT:MgH 20:20 10000 magnification.
    2j FRPP 71(s)—HNT:FR-B: $Mg(OH)_2$ 4:12:4 10000 magnification.

FIGS. 2k-2m show NHT disperses well in the PP matrix. Specifically:
    2k NN—30% HNT 5,000 magnification.
    2l NN 30% HNT mag 10,000.
    2m NN—30% HNT 25,000 magnification.

FIGS. 2n-2w show FR 104-1—20% FR-B+10% Talc—Show the distribution of platy talc and FR-B—Pass UL-94-V-0 test.

FIGS. 2x-2y show FR 86—20% FR-B+10% Mg(OH)$_2$ FR-B disappears due to a reaction with Mg(OH)$_2$ Fails the UL-94-V-0 FR test.

FIGS. 2z-2cc show FR 87—20% FR-B+10% HNT—Fails the UL-94-V-0 FR test.

PREPARATION AND PRODUCT EXAMPLE 1

Figure 1:
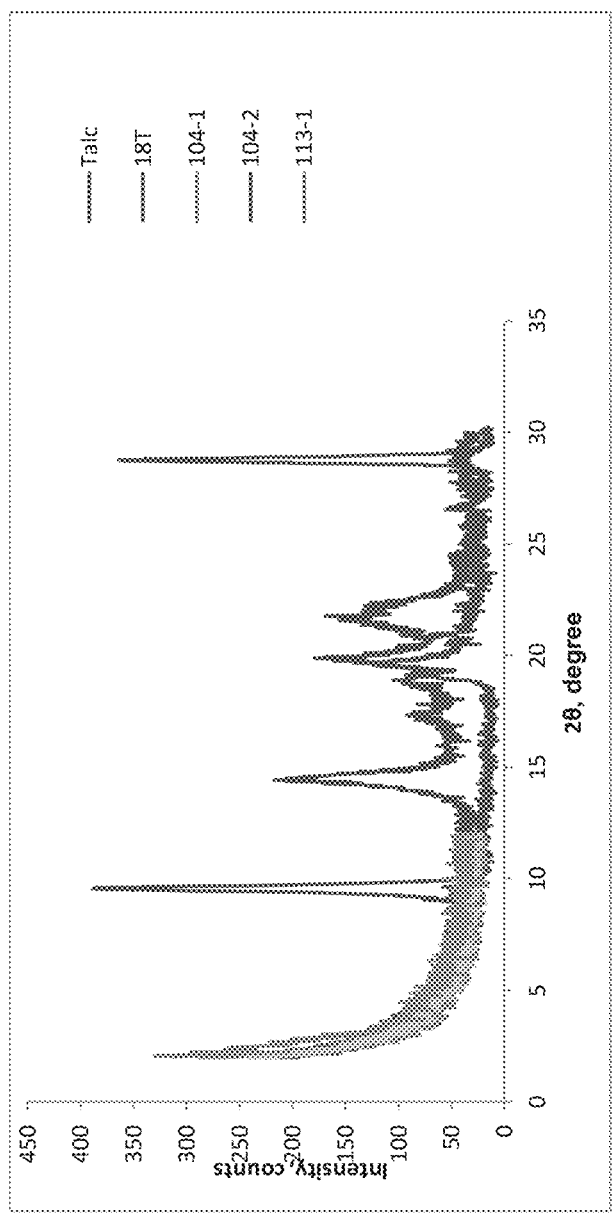
FIG. 1 shows the X-ray powder diffraction pattern of talc and talc in a number of PP blends with Budit 3167 of the present invention, illustrating exfoliation of talc in the PP Budit 3167 blends.

The most preferred blend of the present invention involves the initial formation of a first master batch of 59% polypropylene (HA 5009), 40% fire retardant (Budit®3167), and 1% Irganox® 1010 as antioxidant (known as 40% FR-B Masterbatch FR 113).

| 40% FR-B Masterbatch (FR 113) | |
|---|---|
| Component | % wt/wt |
| HA 5009 (Polypropylene) | 59 |
| Budit ® 3167 (FR B) | 40 |
| Irganox ®1010 (Antioxidant) | 1 |

A second masterbatch of 60% talc-filled polypropylene is also prepared.

| Second Masterbatch | |
|---|---|
| Component | % wt/wt |
| BI 750 (Polypropylene) | 40 |
| Plustalc N625 (Talc) | 60 |

Alternatively, a 60% talc filled polypropylene masterbatch available from a commercial source can be used as the second masterbatch. This has the following composition:

| 60% talc filled masterbatch | |
|---|---|
| Material | % wt/wt |
| Polypropylene BI 750 | 28 |
| Talc (Plustalc N625) | 60 |
| TiO$_2$ | 6 |
| Carbon fibre | 0.5 |
| Process aid | 4.0 |
| Calcium stearate | 0.5 |
| Anti-static agent | 0.4 |
| Ultra marine blue | 0.1 |
| Irganox ®1010 | 0.5 |
| | 100.0 |

The first masterbatch and second masterbatch are combined, and extra polypropylene (HA5009) is subsequently added to adjust the fire retardant level to about 20% and the talc level to about 10%.

| FR 113-1 | | |
|---|---|---|
| Batch and Amount | Material | % wt/wt |
| 40% FR-B Masterbatch (FR 113) at 49.9% of total | HA 5009 (Polypropylene) | 29.44% |
| | Budit ®3167 (FR B) | 19.96% |
| | Irganox ®1010 (Antioxidant) | 0.5% |
| Second Masterbatch at 16.22% of total | BI 750 (Polypropylene) | 6.49% |
| | Plustalc N625 (Talc) | 9.73% |
| | Irganox ®1010 | 0.19% |
| Polypropylene at 33.68% of total | HA 5009 (Polypropylene) | 33.68% |
| | | 99.99% |

Or, combining ultimate amounts:

| FR 113-1 | |
|---|---|
| Material | % wt/wt |
| HA 5009 + BI 750 (Polypropylene) | 69.61% |
| Budit ®3167 (FR B) | 19.96% |
| Irganox ®1010 (Antioxidant) | 0.69% |
| Plustalc N625 (Talc) | 9.73% |
| | 99.99% |

PREPARATION AND PRODUCT EXAMPLE 2

Alternative fire retardant polypropylenes were prepared as follows. These were FR104-1, FR104-2 and FR104-3. A first masterbatch was prepared that contained polypropylene, fire retardant and Irganox 1010®:

| 40% FR-B Masterbatch based on BI 452 (FR 100) | |
|---|---|
| Material | % wt/wt |
| PP BI 452 | 59 |
| Budit ®3167 | 40 |
| Irganox ®1010 | 1 |

A second Masterbatch containing polypropylene and talc was also prepared.

| Second Masterbatch | |
|---|---|
| Component | % wt/wt |
| BI 750 (Polypropylene) | 40 |
| Plustalc N625 (Talc) | 60 |

The first masterbatch and second masterbatch are combined in varying amounts to control the total amounts of talc and fire retardant. Extra polypropylene (BI452) is added as required to adjust the fire retardant level to about 20% and the talc level to about 10%.

| Batch and Amount | Material | Comparative Examples | | |
|---|---|---|---|---|
| | | FR 104-1 % wt/wt | FR 104-1 EX % wt/wt | FR 104-2 % wt/wt |
| 40% FR-B Masterbatch (FR 100) At 50% | Polypropylene BI 452 59% | 29.5 | 29.5 | 29.5 |
| | Budit ®3167 (FR B) 40% | 20 | 20 | 20 |
| | Irganox ®1010 (Antioxidant) 1% | 0.5 | 0.5 | 0.5 |
| Second Masterbatch at 16.25 or 33.25% | BI 750 (polypropylene) 40% | 6.5 | 6.5 | 13.3 |
| | Plustalc N625 (Talc) 60% | 9.75 | 9.75 | 19.95 |
| Polypropylene BI 452 at 33.275% or 16.75% | | 33.75 | 33.75 | 16.75 |
| | | 100 | 100 | 100 |

Or, combining ultimate amounts:

| Material | FR 104-1 % wt/wt | FR 104-1 EX % wt/wt | FR 104-2 % wt/wt |
|---|---|---|---|
| BI 750 + BI 452 (Polypropylene) | 69.75 | 69.75 | 59.55 |
| Budit ®3167 (FR B) | 20 | 20 | 20 |
| Irganox ®1010 (Antioxidant) | 0.5 | 0.5 | 0.5 |
| Plustalc N625 (Talc) | 9.75 | 9.75 | 19.95 |
| | 100.00 | 100.00 | 100.00 |

It will be appreciated that different masterbatches can be used to achieve the same final polypropylene, fire retardant, talc and antioxidant ratios in the final product. The important step required is to ensure that the talc is blended with the polypropylene prior to the fire retardant to ensure no deleterious interactions between the talc and the fire retardant.

Physical Tests

A number of tests were then run to determine the physical and fire retardancy properties of the polypropylenes of the present invention. These were compared against non fire retardant polypropylenes and also against some comparative examples prepared by simple mixing rather than the "masterbatch" process of the present invention, as well as against formulations prepared solely for strength or fire retardancy, but not both. The following comparative examples are referred to throughout the text:

| Material | Comparative examples | | |
|---|---|---|---|
| | FR 93 % wt/wt | FR 98 % wt/wt | FR 103 % wt/wt |
| Polypropylene BI 452 | 79.5 | 72.37 | |
| Budit ®3167 | 19.5 | 17.72 | 20 |
| Irganox ®1010 | 1.0 | | |
| Talc (Plustalc N625) | | 5.4 | 30 |
| Polypropylene | | 3.6 | 50 |

The properties of the preferred composition of the present invention are shown in the table below. The flexural modulus is a simple three point text, with an elongate section of the test material held at either end and pressed downwardly in the middle, whilst observing the force required to cause a specified deviation.

| Property | Polypropylenes | | Preferred fire retardant polypropylenes of the present invention | | Comparative fire retardant polypropylenes | | | | | |
|---|---|---|---|---|---|---|---|---|---|---|
| | HA 5009 | PP BI 452 | FR 113-1 | FR 104-2 | FR 100 | FR 104-1 | 1FR104-EX | FR93 | FR 98 | FR 103 |
| Flexural modulus GPa | 2.15 | 1.93 | 3.00 | 2.83 | 2.37 | 2.56 | 2.44 | 2.07 | 2.08 | 3.31 |
| Tensile modulus GPa | 2.20 | 2.08 | 2.98 | 3.03 | 2.87 | 2.66 | 2.64 | 2.37 | 2.32 | 3.47 |
| Tensile strength MPa | 33.8 | 27.2 | 21.5 | 18.6 | 17.5 | 19.2 | 20.6 | 22.7 | 11.53 | 66.83 |
| Impact strength J m$^{-1}$ | 26.8 | 100 | 29.5 | 25.08 | 23.1 | 24.79 | | 26.49 | 24.54 | 27.15 |

Physical and Fire Retardancy Tests

Fire retardancy is determined according to the UL 94 (Underwriters Laboratory) test standard for flammability, summarised in the table below (http://www.boedeker.com/bpi-u194.htm)

| | |
|---|---|
| 5VA Surface Burn | Burning stops within 60 seconds after five applications of five seconds each of a flame (larger than that used in Vertical Burn testing) to a test bar. Test specimens MAY NOT have a burn-through (no hole). This is the highest (most flame retardant) UL94 rating. |
| 5VB Surface Burn | Burning stops within 60 seconds after five applications of five seconds each of a flame (larger than that used in Vertical Burn testing) to a test bar. Test specimens MAY HAVE a burn-through (a hole). |
| V-0 Vertical Burn | Burning stops within 10 seconds after two applications of ten seconds each of a flame to a test bar. NO flaming drips are allowed. |
| V-1 Vertical Burn | Burning stops within 60 seconds after two applications of ten seconds each of a flame to a test bar. NO flaming drips are allowed. |
| V-2 Vertical Burn | Burning stops within 60 seconds after two applications of ten seconds each of a flame to a test bar. Flaming drips ARE allowed. |
| H-B Horizontal Burn | Slow horizontal burning on a 3 mm thick specimen with a burning rate is less than 3"/min or stops burning before the 5" mark. H-B rated materials are considered "self-extinguishing". This is the lowest (least flame retardant) UL94 rating. |

Table 1 shows some commercially available fire retardant polypropylene materials which are UL 94 rated as V-0 and compares their physical properties. A number of general conclusions can be drawn from the data. All halogen-free commercial fire retardant polypropylenes have a lower FM (flexural modulus) than the samples of the present invention. The main drawback of halogen-free fire retardant polypropylenes is the lack of stiffness, which is <2 GPa in all cases. Some halogenated products have acceptable physical properties, but of course these suffer from the drawback of producing dangerous fumes on ignition. Halogenated products could be strengthened to very high FM's, as can be seen for the glass fibre products, however, these materials were of low processability.

Figure 3:
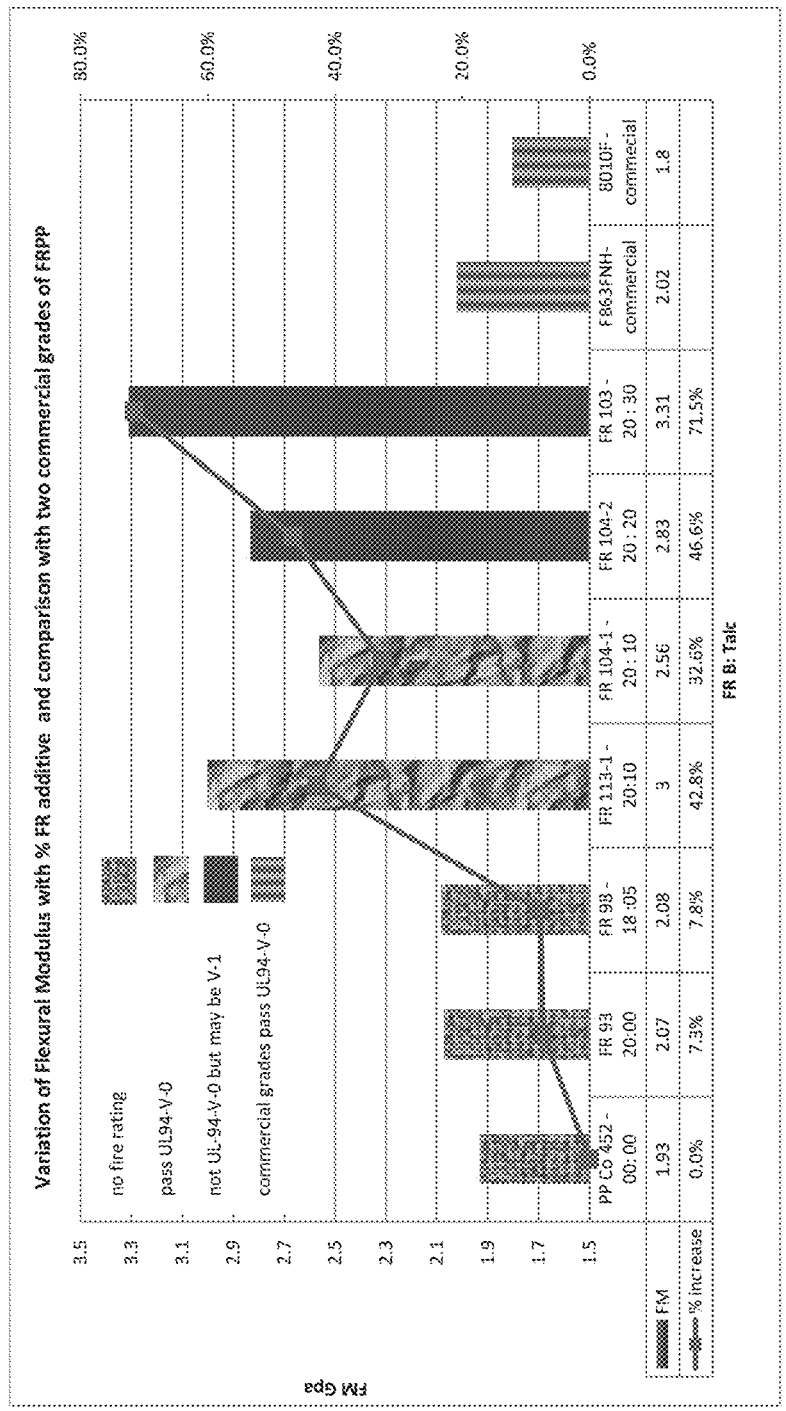
FIG. 3 shows Variation of Flexural Modulus with % FR additive and comparison with two commercial grades of FRPP.
Figure 4:
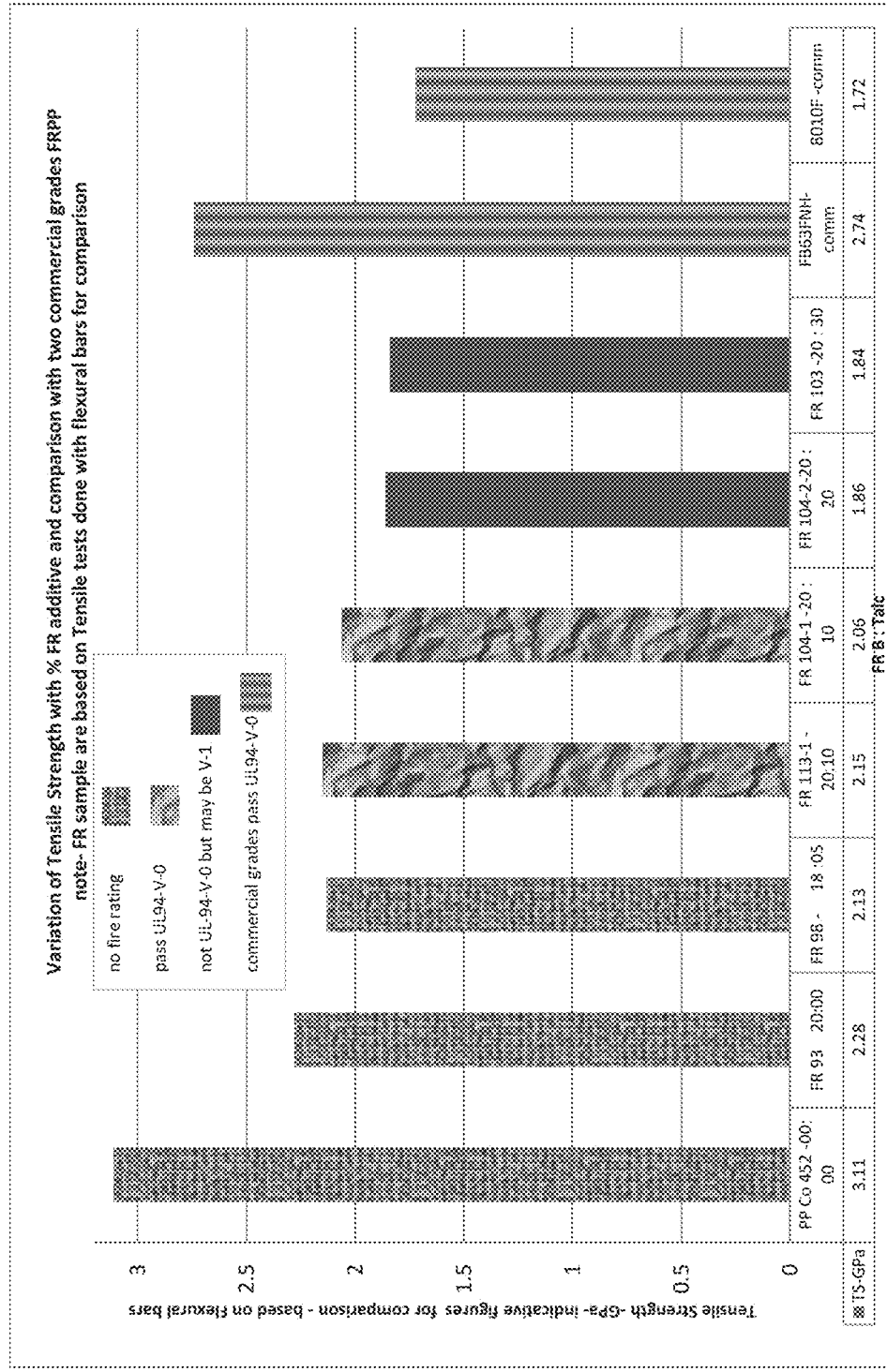
FIG. 4 shows Variation of Tensile Strength with % FR additive and comparison with two commercial grades FRPP. Note—FR sample are based on Tensile tests done with flexural bars for comparison.
Figure 5:
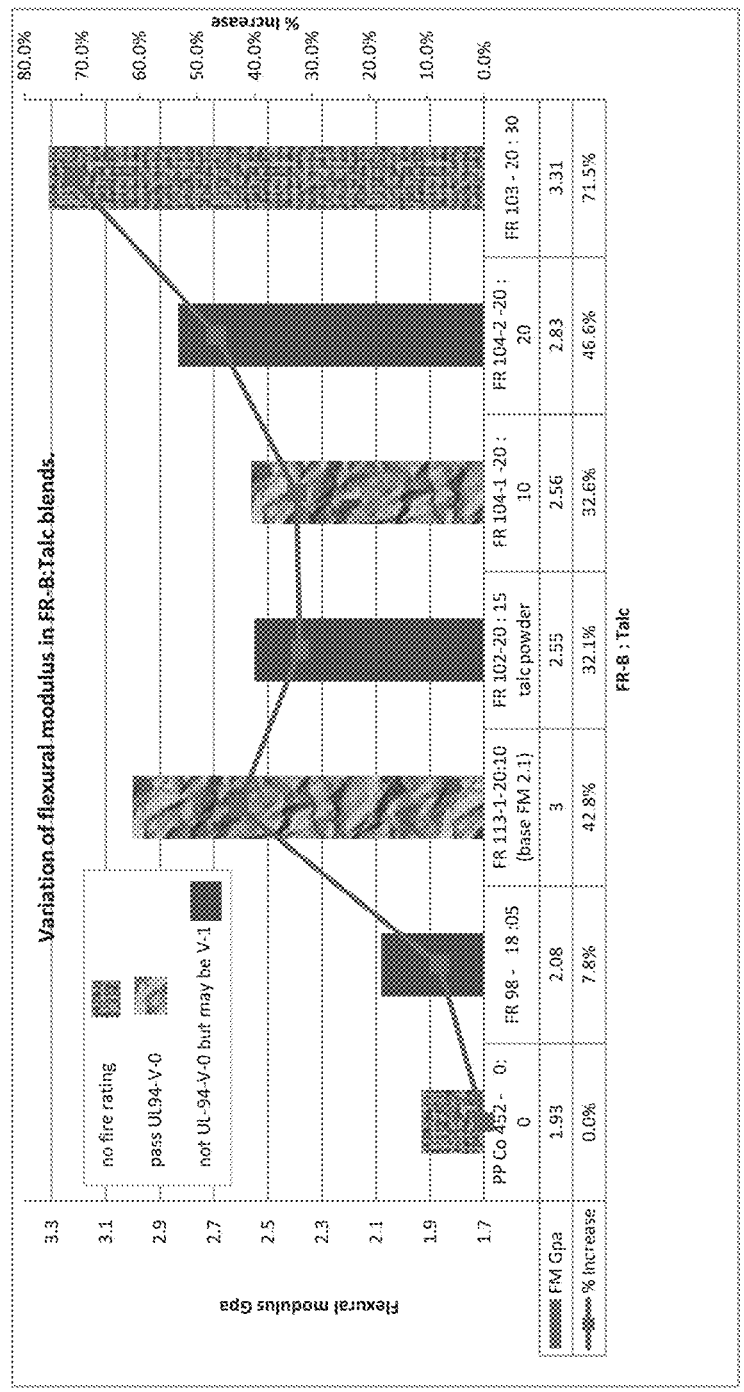
FIG. 5 shows Variation of flexural modulus in FR-B:Talc blends.

Table 2 and FIGS. 3 to 5 show consolidated results for a variety of compositions, including some comparative fire retardant polypropylenes. The labelled "FR" are the fire retardant polypropylenes of the present invention. The % of fire retardant and talc presented in all Tables are the % in the end composition.

Samples PPCo452 (polypropylene without any added fire retardant additives), FR93 and FR98 were not fire rated. Samples 113-1, 104-1 are the two preferred embodiments of the present invention with a V-0 fire rating plus high stiffness.

Sample 103 has high stiffness but not quite V-0 fire rating. Sample 104-2 was also not quite V-0 fire rated. Both were approximately V-1

The present inventors have found that polymer crystallinity can be improved by the addition of an inert filler such as talc that acts as a nucleating agent for the polypropylene. This leads to improvements in the crystallization temperature with lower heat flow that could eventually result in a higher heat

TABLE 1

| Product | Supplier | Halogenated | UL-94 rating | TS/YS MPa | FM GPa | TM GPa | Density kg/m3 | HDT - 1.8 MPa | Notched Impact St |
|---|---|---|---|---|---|---|---|---|---|
| Polyflam RIPP 490 * | A Schulman (Gmbh) | NO | V-0 | 22.0 | — | 1.9 | 1.04 | 58 | 3 kJ/m² |
| Polyflam RIPP 3625 CS1-FRPP brominated | A Schulman (Gmbh) | YES | V-0 | 17.0 | 3.5 | 2.2 | 1.39 | 54 | 7.5 kJ/m² |
| 8010F - halogenated | Asia Enterprise (HK) | YES | V-0 | 17.2 | 1.8 | 2.2 | 1.01 | 81 | 50 J/m |
| FB63FNH | Samsung Total min.5T | NO | V-0 | 27.4 | 2.02 | | 1.02 | 120 | 3.8 kgcm/cm (Izod) |
| FB50NHD1 | Samsung Total (min.5T) | NO | V-0 | 28.4 | 2.10 | | 1.02 | 128 | 4.0 kgcm/cm (Izod) |
| FB55G (20% Glass Fiber filled) | Samsung Total (min.5T) | YES | V-0 | 71.0 | 5.30 | | 1.63 | 163 | 12.0 kgcm/cm (Izod) |

Ignition Tests

In addition to the UL94 tests, the IEC Glow Wire Ignition (GWI) & IEC Glow Wire Temperature (GWT) values are helpful in assessing the usefulness of the produces to raw material manufacturers and end users respectively. The fire retardant polypropylenes of the present invention passed the GWFI test and have a GWIT value of >950° C.

deflection temperature, better warpage, shrinkage and dimensional control and improvement in injection molding cycle times, where parts can be removed more quickly from the mold providing productivity optimization. High stiffness also allows a reduction in wall thickness of molded products. The flexural modulus and impact strength also improved primarily due to increase in the crystallization of the polypropylene.

TABLE 2

| Properties | Test Method | Condition | Unit | FR 13 | FR 84 | FR 70 | FR104-1* | FR 113-1 | FR 103 |
|---|---|---|---|---|---|---|---|---|---|
| Physical Properties | | | | | | | | | |
| Melt Index* - (reads 2 units less) | ASTM D1238 | 2.16 kg/ 230° C. | g/10 min | 5.8 base MFI-12 | 4.9 | 10 base MFI-12 | 5.4 base MFI-8 | 10.8 base MFI-18 | |
| Specific Gravity | ASTM D 792 | — | g/cm³ | 1.10 | 1.25 | 1.02 | 1.11 | 1.11 | 1.33 |
| Mechanical & Thermal Properties | | | | | | | | | |
| Tensile Strength (Yield)-Flex bars | ASTM (D638) | 5 mm/min | MPa | 31.21 | 29.5 | 25.6 | 20.6 | 21.5 | 18.4 |
| Tensile modulus | ASTM D790 | 5 mm/min | GPa | 3.15 | 3.19 | 2.40 | 2.66 | 2.98 | 3.47 |
| Flexural modulus | ASTM D790 | 5 mm/min | | 2.97 | 3.25 | 2.26 | 2.56 | 3.00 | 3.31 |
| Notched Charpy impact strength | ASTM D6110 | 0.5 J hammer | J/m | 24.33 | 25.70 | 23.28 | 24.79 | 25.00 | 27.15 |
| Recognition | | | | | | | | | |
| Flammability | UL-94/ASTM D3801 | — | — | No UL-V rating | No UL-V rating | V-0 | V-0 | V-0 | No UL-V-rating |
| | IEC695-2-12-GWFI-775C | | | | Pass | Pass | Pass | Pass | |
| | IEC695-2-13-GWIT- | Highest - no drip | ° C. | | | 950° C. | 950° C. | 950° C. | |
| % Total powders | — | — | % | 26% | 30% | 20% | 30% | 30% | 50% (20% B + 30% talc) |
| Raw material cost - | — | — | NZ $ | $ 3.38 | $ 6.48 | $ 6.38 | $ 5.75 | $ 5.75 | $ 5.71 |

The differential scanning calorimetry (DSC) data below show how the crystalline temperature and the heat flow varies with different additives.

Furthermore, these data show that the incorporation of fillers acts as a diluent or a heat sink and reduces the heat flow which could result in reduction of concentration of decomposition gases. However, too much or too little filler can diminish the action of the fire retardant in the final material.

FRPP 113-1 grade shows higher peak crystallization temperature of 129.3° C. giving processing advantages such as improvements in cycle times and hence the processing productivity, low warpage, better aesthetics (haze and gloss) and high stiffness.

FR 104-1 EX is FR 104-1 that has been extruded with 40% FR-B and 60% talc masterbatches after blending. That sample did not pass the UL-94-V-0 test (it had a V-1 rating). It is believed that the further shear applied by the extruder could damage the talc structure and mask the fire retardant.

| DSC information | | |
|---|---|---|
| Sample | Peak crystallization temperature ° C. | Exothermic crystallization heat flow J/g |
| 8010 - brominated from Asia | 116.4 (broad peak) | 54.6 |
| RIPP-3625 brominated from A Schulman | 118.5 (broad peak) | 29.8 (XRF shows presence of Br + $Sb_2O_3$ + $Mg(OH)_2$ |
| BI 452 - high crystallinity polypropylene | 126.4 (narrow peak) | 105.9 |
| BI 750 - high crystallinity polypropylene talc base | 129.3 | 76.9 |
| FR104-1 | 124.7 (narrow peak) | 59.0 |

-continued

| DSC information | | |
|---|---|---|
| Sample | Peak crystallization temperature ° C. | Exothermic crystallization heat flow J/g |
| FR104-2- | 124.9 (narrow peak) | 48.8 |
| HA 5009 - high crystallinity polypropylene | 126.5 | 100.4 |
| FR 113 | 125.8 (narrow peak) | 55.8 |
| FR113-1 | 129.3 (narrow peak) | 72.9 |

Workability Data

The workability of fire retardant materials is an important consideration. The workability was tested as follows:

Processing Data

Processing was carried out in a twin screw extruder. For example, a masterbatch of 40% Budit®3167 in polypropylene was prepared using the method below as follows: The masterbatch mixture (i.e. polypropylene pellets+fire retardant additive Budit®3167+Antioxidant Irganox® 1010) was pre-mixed in a sealed polyethylene bag, fed into the hopper and extruded using the twin-screw feeder. The temperature profile was 185° C., 185° C., 195° C., 195° C., 200° C., 200° C., 220° C., 220° C. and 220° C. respectively, from the feeding zone to the heating zones. The die temperature was approximately 220° C. Extruded strands were pelletized.

Injection Molding Parameters

The 40% Budit®3167 based masterbatch was mixed (with 60% talc based masterbatch in some formulations—FR 98, FR 104-1, 104-2, 113-1, 103) and blended with polypropylene so that the final formulation had approximately 20% Budit®3167, the optimized level of fire retardant additive tested. All formulations contain approximately 1% antioxidant to protect the possible thermal degradation of polypropylene. These blends were injection molded using the temperature profile 195-220° C., pressure 80-100 bar, mold temperature 29-30° C., injection speed 50 mm/s, pack pressure 40 bar, pack time 3 s, back pressure 15 bar, screw speed for plasticizer 80 rpm.

Extrusion Tests

The fire retardant polypropylene of the present invention has proven to be relatively highly processable for a material having such good fire resistant properties and mechanical strength. In particular, the preferred fire retardant polypropylene of the present invention was tested for extrudability in comparison with a reinforced polypropylene of similar strength.

Extrusion trials were conducted on the preferred fire retardant polypropylene of the present invention (FR113-1) and GC20282H, which is a glass fibre reinforced polypropylene of comparable mechanical strength to FR113-1.

A rheology test was used to establish the pressures involved for a given injection speed. While this test is not comprehensive, it does provide some guidance as to how processable the material is likely to be.

| RHEOLOGY DATA | | |
|---|---|---|
| | GC20282H | FR113-1 |
| Peak Injection Pressure (kgf) | 45 | 33 |
| Fill Time (s) | 0.35 | 0.31 |
| Peak Hold Pressure (kgf) | 30 | 25 |
| Back Pressure (kgf) | 5 | 5 |
| Injection Speed Set-point (%) | 50 | 50 |

50% = 72 mm/s injection speed

Figure 6:
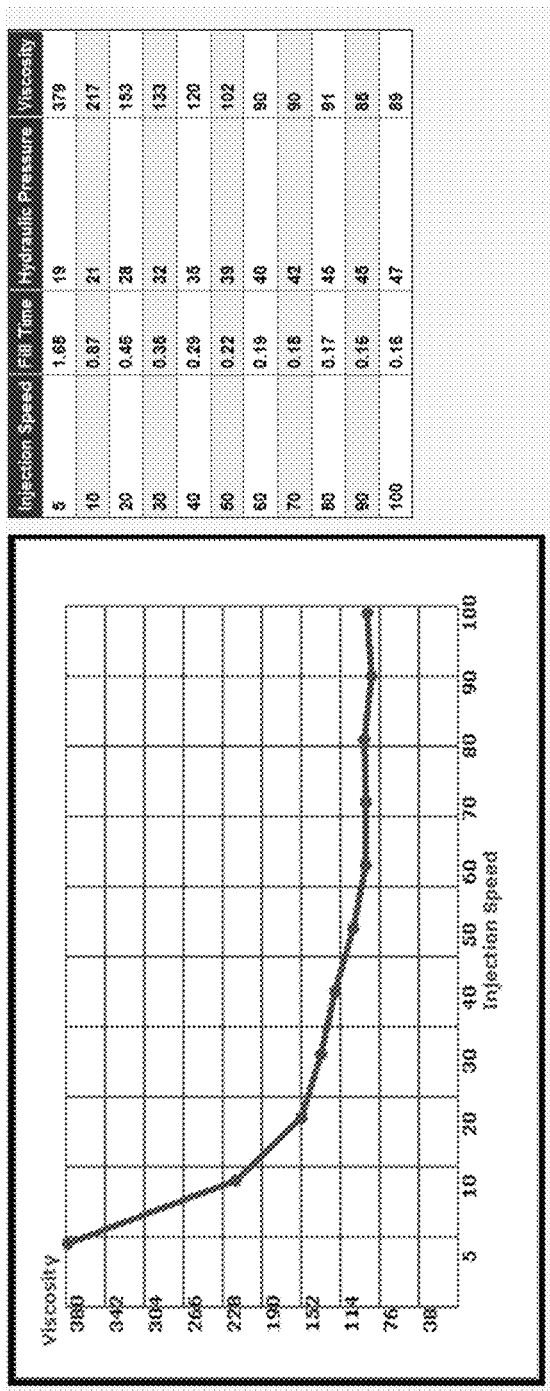
FIGS. 6 and 7 show injection speed, fill time, pressure and viscosity relationships for the fire retardant polypropylene of the present invention and a reinforced polypropylene of similar mechanical strength, respectively.
Figure 7:
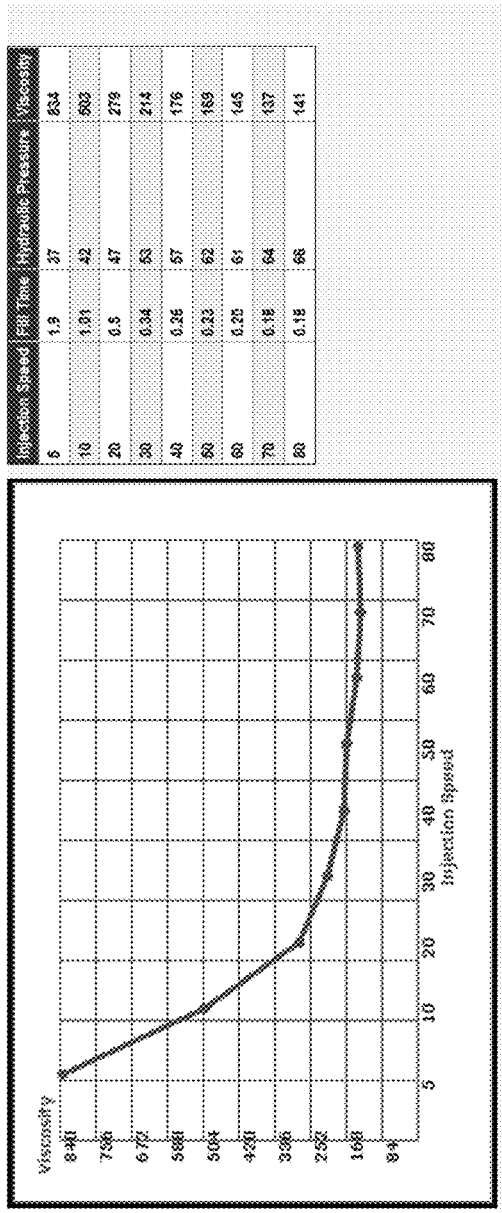

FIGS. 6 and 7 show injection speed, fill time, pressure and viscosity relationships for the fire retardant polypropylene of the present invention and a reinforced polypropylene of similar mechanical strength, respectively. It can be seen that the fire retardant polypropylene of the present invention was processable at a much lower hydraulic pressure and was of lower viscosity, resulting in much less wear and damage to the processing equipment.

Overall the fire retardant material of the present invention was found to be fairly 'robust' in regards to processing.

The invention claimed is:

1. A fire retardant material, consisting essentially of about 60-80% wt of polypropylene, about 10-35% wt of an ammonium polyphosphate fire retardant agent, and about 5-20% wt of a filler, wherein the fire retardant material has a flexural modulus greater than 2 GPa and a fire retardancy rating of UL-94 V-1 or better, wherein the filler is talc exfoliated in the polypropylene and fire retardant blend.

2. The fire retardant material according to claim 1 which is halogen-free and/or free from glass-fibers.

3. The fire retardant material according to claim 1 wherein the fire retardant is an ammonium polyphosphate.

4. The fire retardant material according to claim 1 wherein the fire retardant is a polymeric APP-crystal phase II type fire retardant.

5. The fire retardant material according to claim 1 further comprising an antioxidant.

6. A method of forming a fire retardant material having a flexural modulus of at least 2 GPa and a fire retardancy rating of UL-94 V-1 or greater, the method comprising:
   forming a first masterbatch blend of polypropylene and talc filler; and
   combining the first blend with (i) a fire masterbatch retardant, or (ii) a second blend of polypropylene and a fire retardant;
   wherein the fire retardant material consists of about 60-80% wt of the polypropylene, about 5-20% wt of the talc filler, and about 10-35% wt of the fire retardant agent.

7. The method according to claim 6 wherein the fire retardant is an ammonium polyphosphate.

8. The method according to claim 6 wherein the fire retardant is a polymeric APP-crystal phase II type fire retardant.

9. The method according to claim 6, further comprising adding an antioxidant.

10. The fire retardant material according to claim 1, wherein the flexural modulus is 3 GPa or above and the fire retardancy rating is UL-94 V-0.

11. A fire retardant material, consisting essentially of about 60-80% wt polypropylene, about 10-35% wt of an ammonium polyphosphate fire retardant agent, and about 5-20% wt of a talc filler, wherein the fire retardant material has a flexural modulus greater than 2 GPa and a fire retardancy rating of UL-94 V-1 or better, wherein the polypropylene has a Glow Wire Ignition Temperature (GWIT) of at least 950° C.

12. A fire retardant material, consisting essentially of at least about 70% wt polypropylene, about 10-35% wt of a fire retardant agent, and about 5-20% wt of a talc filler, wherein the fire retardant material having has a flexural modulus greater than 2.8 GPa and a fire retardancy rating of UL-94 V-0 or better.

13. The fire retardant material according to claim 12, wherein the polypropylene has a Glow Wire Ignition Temperature (GWIT) of at least 950° C.

14. The fire retardant material according to claim 12, wherein the talc filler is exfoliated in the polypropylene and fire retardant blend.

15. The method according to claim 6, further comprising adding polypropylene to the second blend.

16. The method according to claim 6, wherein the polypropylene has a Glow Wire Ignition Temperature (GWIT) of at least 950° C.

17. The method according to claim 6, wherein the talc filler is exfoliated in the polypropylene and fire retardant blend.

18. A method of forming a fire retardant material having a flexural modulus of at least 2.8 GPa and a fire retardancy rating of UL-94 V-0 or better, the method comprising:
   forming a first masterbatch blend of polypropylene and talc filler; and
   combining the first masterbatch blend with (i) a fire retardant, or (ii) a second blend of polypropylene and a fire retardant;
   wherein the fire retardant material consists of at least about 70% wt of the polypropylene, about 5-20% wt of the talc filler, and about 10-35% wt of the fire retardant agent.

19. The method according to claim 18, further comprising adding polypropylene to the second blend.

20. The method according to claim 18, wherein the polypropylene has a Glow Wire Ignition Temperature (GWIT) of at least 950° C.

21. The method according to claim 6, wherein the combining step is not by extrusion.

22. The method according to claim 18, wherein the combining step is not by extrusion.

23. The method according to claim 6 wherein the fire retardant is an ammonium polyphosphate.

24. The method according to claim 18 wherein the fire retardant is an ammonium polyphosphate.

25. The fire retardant material according to claim 1, wherein the polypropylene has a Glow Wire Ignition Temperature (GWIT) of at least 950° C.

* * * * *